(12) United States Patent
Mei

(10) Patent No.: US 12,394,965 B2
(45) Date of Patent: Aug. 19, 2025

(54) PANEL ASSEMBLY AND MOUNTING BOX

(71) Applicant: Shanghai Kohler Electronics, Ltd., Shanghai (CN)

(72) Inventor: Jianjun Mei, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 261 days.

(21) Appl. No.: 18/206,189

(22) Filed: Jun. 6, 2023

(65) Prior Publication Data

US 2023/0396048 A1 Dec. 7, 2023

(30) Foreign Application Priority Data

Jun. 7, 2022 (CN) .......................... 202221410593.5

(51) Int. Cl.
*H02G 3/22* (2006.01)
*H02G 3/08* (2006.01)
*H02G 3/32* (2006.01)

(52) U.S. Cl.
CPC ............... *H02G 3/22* (2013.01); *H02G 3/081* (2013.01); *H02G 3/32* (2013.01)

(58) Field of Classification Search
CPC ............ H02G 3/22; H02G 3/081; H02G 3/32; H02G 3/14

USPC ......................................................... 174/650
See application file for complete search history.

(56) References Cited

U.S. PATENT DOCUMENTS

| | | | |
|---|---|---|---|
| 2013/0042539 A1* | 2/2013 | Burns | E04B 1/38 52/27 |
| 2014/0367136 A1* | 12/2014 | Trojanowski | H02G 3/14 174/66 |
| 2016/0040700 A1* | 2/2016 | Trojanowski | F16B 5/0628 29/592 |
| 2016/0204588 A1* | 7/2016 | Trojanowski | H02G 3/081 174/66 |

\* cited by examiner

*Primary Examiner* — Timothy J Thompson
*Assistant Examiner* — Michael F McAllister
(74) *Attorney, Agent, or Firm* — Lempia Summerfield Katz LLC

(57) ABSTRACT

A panel assembly includes a mounting plate configured to be connected to a bottom box; a connecting plate detachably connected to the mounting plate; and a panel disposed on the connecting plate, wherein at least one tension strap is connected between the connecting plate and the mounting plate, and wherein when the connecting plate is detached from the mounting plate, the connecting plate and the mounting plate remain connected through the at least one tension strap.

20 Claims, 9 Drawing Sheets

PANEL ASSEMBLY AND MOUNTING BOX

CROSS REFERENCE TO RELATED APPLICATION

This application claims the benefit of priority to: Chinese Patent Application No. 202221410593.5 filed in the Chinese Intellectual Property Office on Jun. 7, 2022, which is hereby incorporated by reference in its entirety.

FIELD

The present disclosure relates to the field of mounting box and particularly relates to a panel assembly and a mounting box.

BACKGROUND

A mounting box is usually configured or mounted on a wall or a floor for implementing electrical installation or wiring harness installation. The mounting box comprises a bottom box and a panel assembly, and the panel assembly comprises a mounting plate, a connecting plate, and a panel. The panel is mounted on the connecting plate, the mounting plate is mounted on an opening of the bottom box by screws, and the connecting plate is mounted to the mounting plate by buckles, screws, etc. When to disassemble the mounting plate for maintenance, users need to first remove the panel and the connecting plate from the mounting plate and then hold the connecting plate and the panel with one hand, so as to prevent the connecting plate and the panel from falling and being damaged. The users may only use one hand to operation for disassembling mounting plate, the operation is extremely inconvenient.

In view of this, it is necessary to provide a panel assembly and a mounting box, which are easy to disassemble and assemble.

SUMMARY

The present disclosure aims to overcome the above defects and provide a panel assembly and a mounting box that are easy to disassemble and maintain.

In an embodiment of the present disclosure, the present disclosure provides a panel assembly comprising a mounting plate configured to be connected to a bottom box, a connecting plate removably/detachably connected with the mounting plate, and a panel mounted or disposed on the connecting plate.

A tension strap is connected between the connecting plate and the mounting plate.

When the connecting plate and the mounting plate are in a disassembled state, the connecting plate is hung on the mounting plate by the tension strap.

In another embodiment of the present disclosure, the connecting plate has a first via hole and the mounting plate has a second via hole.

The tension strap passes through the first via hole and the second via hole with clearance. The tension strap is provided with two stop end sockets on two ends of the tension strap.

In another embodiment of the present disclosure, one tension strap is connected between the edges on each side of the connecting plate and the mounting plate.

In another embodiment of the present disclosure, a slide frame is mounted on the surface, directed away from the connecting plate, of the mounting plate, and the slide frame is slidably connected to the mounting plate.

A buckle is disposed on the connecting plate and configured to be connected to, e.g., in snap-fit connection with, the slide frame, a third via hole is disposed on the mounting plate, and the buckle passes through the third via hole with clearance.

The slide frame has a snap-fit state and a detached state with the buckle.

An elastic member is provided between the mounting plate and the slide frame and configured to drive the slide frame to be in snap-fit connection with the buckle.

In another embodiment of the present disclosure, the mounting plate has a guiding groove on an edge, directed away from/opposite to the elastic member, of the mounting plate, and the slide frame has a guiding claw on an edge, directed away from/opposite to the elastic member, of the slide frame.

The guiding claw is engaged, e.g., in clearance fit, with the guiding groove.

In another embodiment of the present disclosure, the slide frame comprises a first frame edge, a second frame edge, and two third frame edges connected between the first frame edge and the second frame edge.

The buckle is in snap-fit with the first frame edge or the second frame edge, the elastic member is assembled between the mounting plate and the first frame edge or the second frame edge.

Guiding limiting buckles are disposed on the mounting plate configured to guide the two third frame edge to slides.

The two third frame edges are respectively in clearance fit with the guiding limiting buckles.

In another embodiment of the present disclosure, an avoidance groove is disposed on each of the third frame edges and configured to avoid the guiding limiting buckle during assembly.

In another embodiment of the present disclosure, the connecting plate is provided with two buckles, and the mounting plate is provided with two corresponding third via holes.

One of the buckles is in snap-fit with the first frame edge, and the other buckle is in snap-fit with the second frame edge.

In another embodiment of the present disclosure, the mounting plate has a mounting groove, and the elastic member is mounted in the mounting groove and connected with the slide frame.

A stop strip is disposed on the mounting plate, and the stop strip at least partially covers a side opening of the mounting groove.

In another embodiment of the present disclosure, the present disclosure provides a mounting box comprising a bottom box and a panel assembly according to any one of above embodiments. The mounting plate is mounted on a bottom box opening of the bottom box.

The present disclosure has the following beneficial effects.

In the panel assembly and the mounting box according to the present disclosure, the panel is mounted on a connecting plate, and the connecting plate is removably connected to the mounting plate, and a tension strap is connected between the connecting plate and the mounting plate. When the mounting plate needs to be disassembled for maintenance, users may first remove the connecting plate from the mounting plate. The connecting plate is hung on the mounting plate through the tension strap, so that the connecting plate and the panel cannot fall off, and thus both hands may become free. The users can manipulate the removal of the mounting plate with both hands, and thus the convenience of operation can be improved.

BRIEF DESCRIPTION OF THE FIGURES

With reference to the drawings, the contents disclosed by the present disclosure should be more easily understood. It should be understood that these drawings are merely used for illustration and are not intended to limit the protection scope of the present disclosure. In the drawings.

DETAILED DESCRIPTION

Figure 1:
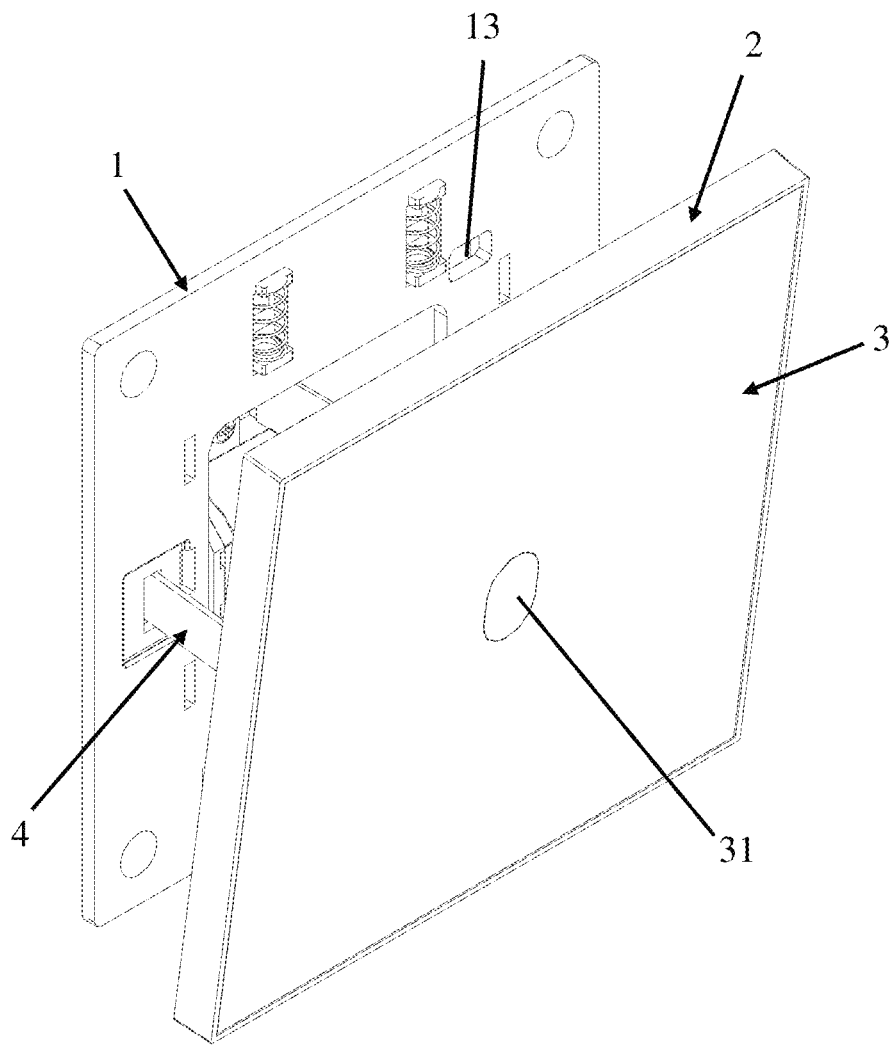
FIG. 1 is a stereoscopic diagram of the panel assembly provided in an example of the present disclosure, wherein a connecting plate is hung on a mounting plate through a tension strap.

The specific embodiments of the present disclosure are further described with reference to the drawings hereinafter. Same and equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 2:
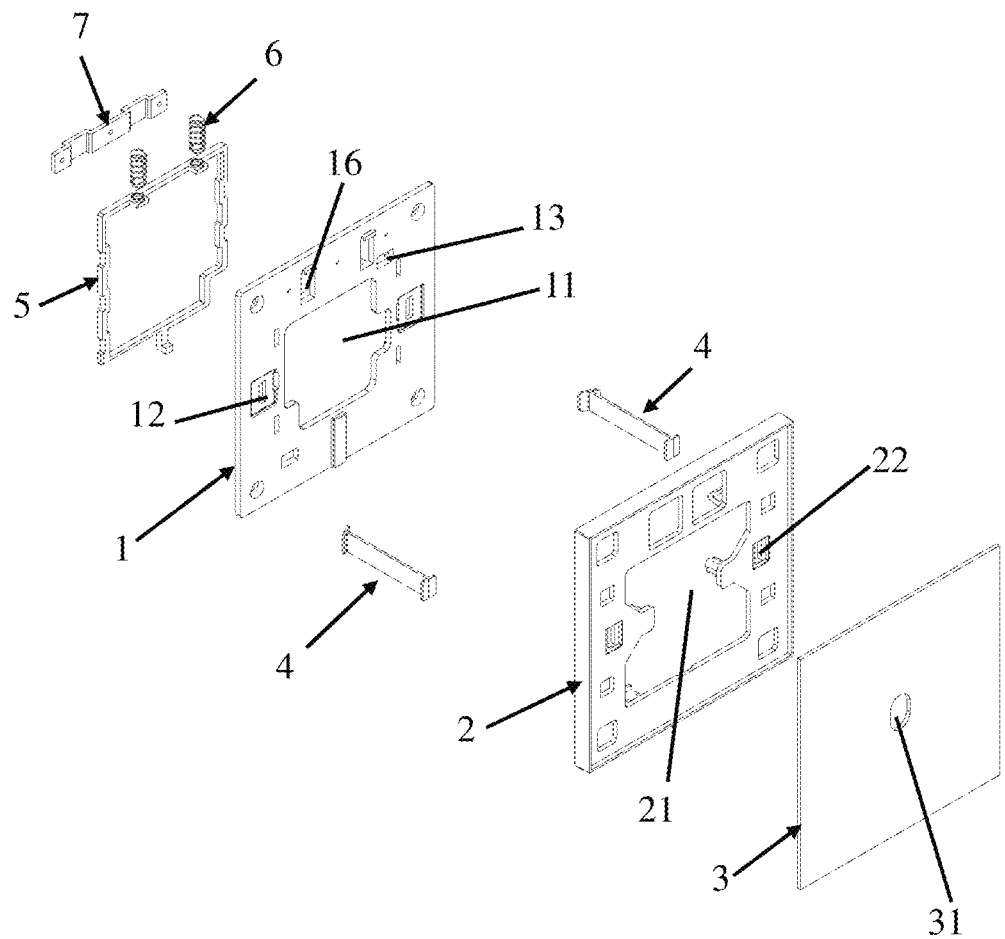
FIG. 2 is an exploded view of the panel assembly provided by an example of the present disclosure.
Figure 3:
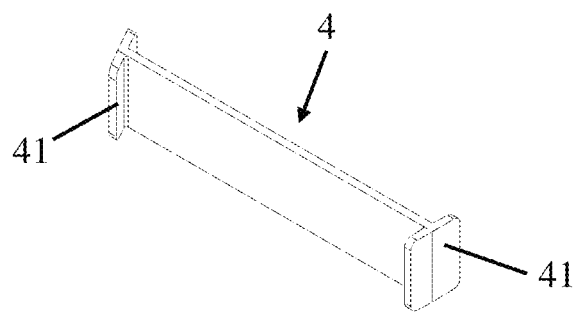
FIG. 3 is a stereoscopic diagram of the tension strap.
Figure 4:
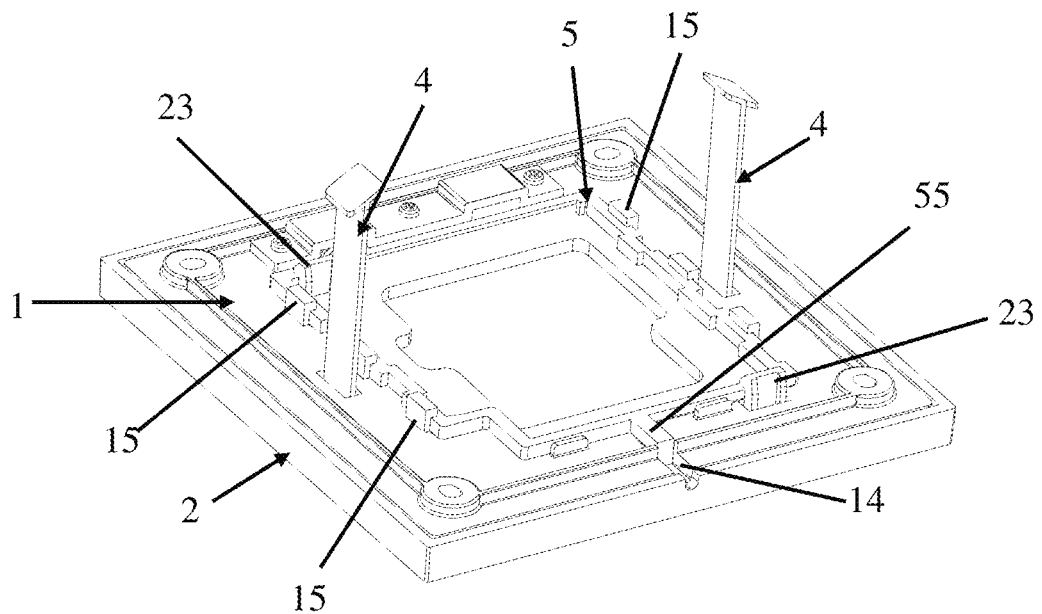
FIG. 4 is a stereoscopic diagram of the panel assembly according to an example of the present disclosure as viewed from the side where the slide frame is located.

FIG. 1 is a stereoscopic diagram of the panel assembly provided in an example of the present disclosure, wherein a connecting plate is hung on a mounting plate through a tension strap; FIG. 2 is an exploded view of the panel assembly provided by an example of the present disclosure; FIG. 3 is a stereoscopic diagram of the tension strap; FIG. 4 is a stereoscopic diagram of the panel assembly according to an example of the present disclosure as viewed from the side where the slide frame is located. As shown in FIGS. 1-4, a panel assembly according to an embodiment of the present disclosure comprises a mounting plate 1 configured to be connected to a bottom box 8, a connecting plate 2 removably connected to the mounting plate 1, and a panel 3 mounted on the connecting plate 2.

A tension strap 4 is connected between the connecting plate 2 and the mounting plate 1.

When the connecting plate 2 is in a disassembled state with the mounting plate 1, the connecting plate 2 is hung on the mounting plate 1 through the tension strap 4.

Figure 12:
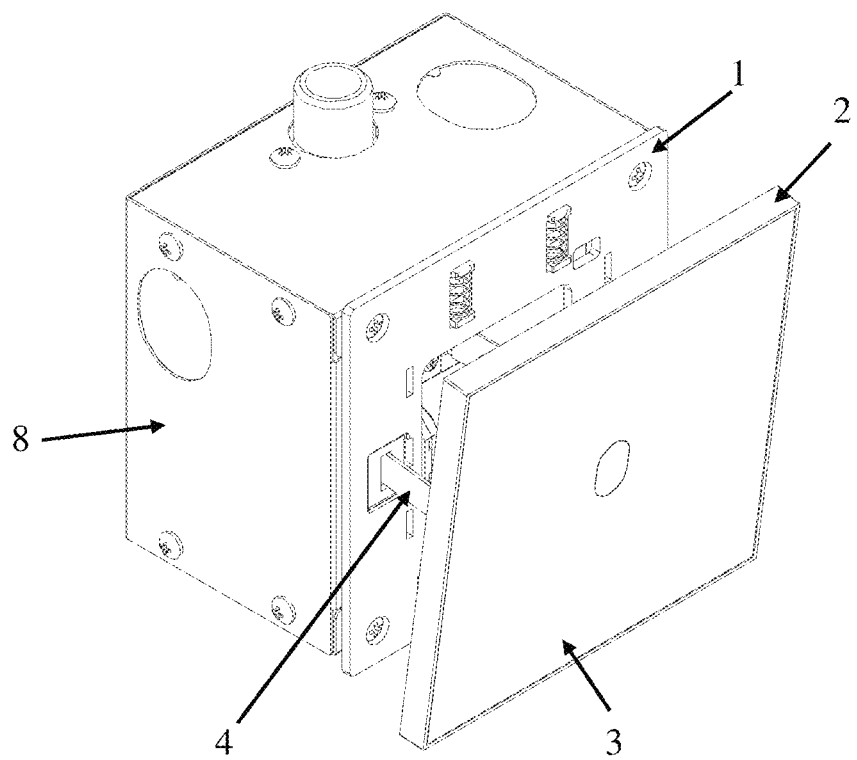
FIG. 12 is a stereoscopic diagram of the mounting box according to an example of the present disclosure, wherein the connecting plate is hung on the mounting plate through a tension strap.
Figure 13:
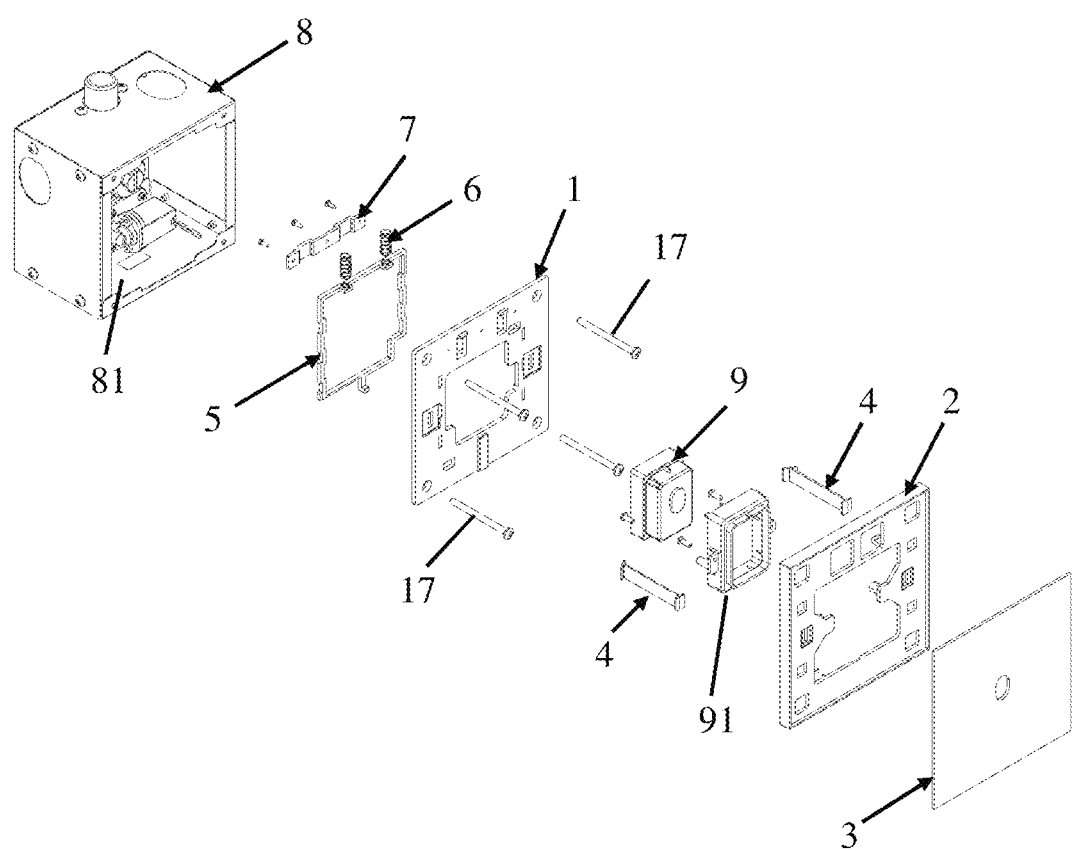
FIG. 13 is an exploded view of the mounting box according to an example of the present disclosure.

The panel assembly according to the present disclosure is configured to be mounted on the bottom box 8 shown in FIGS. 12 and 13. The panel assembly comprises a mounting plate 1, a connecting plate 2, a panel 3, and a tension strap 4. The mounting plate 1 is configured to be mounted on a bottom box opening 81 of the bottom box 8. The panel 3 may be a tempered panel, and the panel 3 is fixedly mounted on the connecting plate 2. The connecting plate 2 and the panel 3 are removably connected, and the connecting plate 2 and the panel 3 may be connected through buckles, screws, magnets, etc. The tension strap 4 is connected between the connecting plate 2 and the mounting plate 1, and the tension strap 4 may be selected from a plastic belt, a flexible belt, a pulling cord, etc. The central part of the mounting plate 1 has a mounting plate through hole 11 for an electric control box 9 and a bracket 91 of the electric control box 9 to pass through. The central part of the connecting plate 2 has a connecting plate through hole 21 for the electric control box 9 and the bracket 91 to pass through. The panel 3 has a panel through hole 31 for wiring harnesses, buttons, etc. to pass through.

During installation, the tension strap 4 is first connected between the connecting plate 2 and the mounting plate 1, and then the mounting plate 1 is mounted on the bottom box 8 through the screw 17 shown in FIG. 13. Then, the connecting plate 2 is mounted on the mounting plate 1, and the tension strap 4 is in a storage state. Thus, the assembly of the connecting plate 2 and the mounting plate 1 is not affected.

To disassemble the panel assembly for maintenance, the mounting plate 1 needs to be removed from the bottom box 8. To this end, the connecting plate 2 is removed from the mounting plate 1, and the tension strap 4 is pulled out. The connecting plate 2 is hung on the mounting plate 1 through the tension strap 4, and the connecting plate 2 and the panel 3 do not fall off. Thus, such a configuration frees the user's hands, the user may disassembly the mounting plate 1 with both hands, and the convenience of operation is enhanced.

Figure 5:
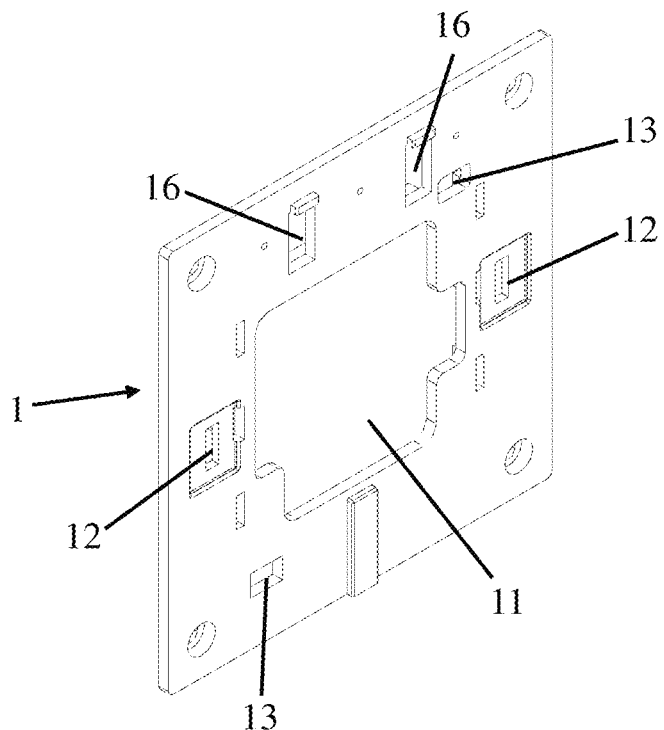
FIG. 5 is a stereoscopic diagram of the mounting plate.
Figure 6:
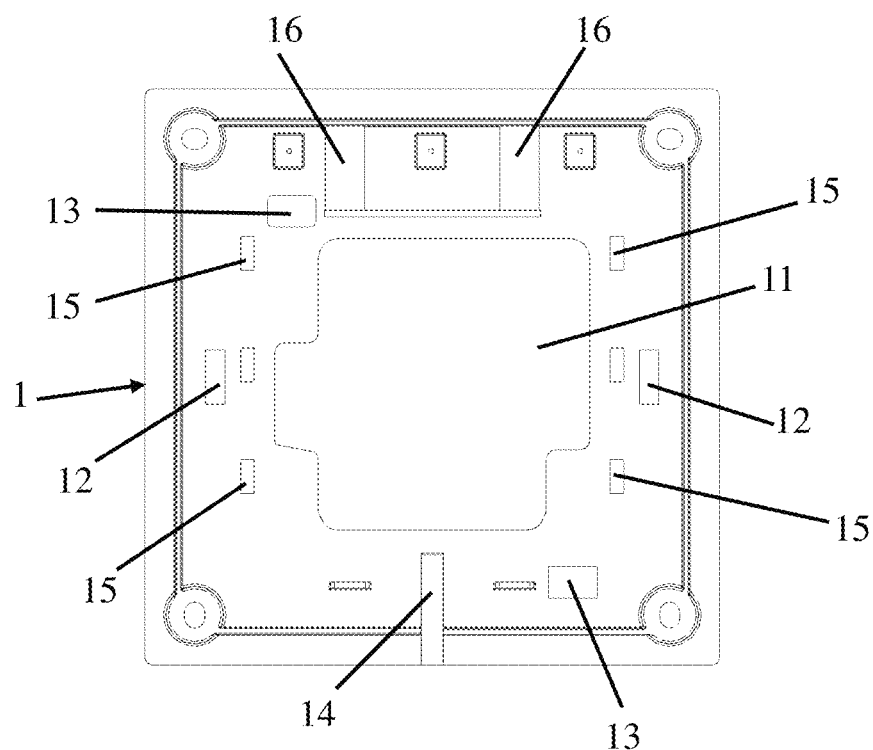
FIG. 6 is a front view of the mounting plate as viewed from a side away from the connecting plate.
Figure 7:
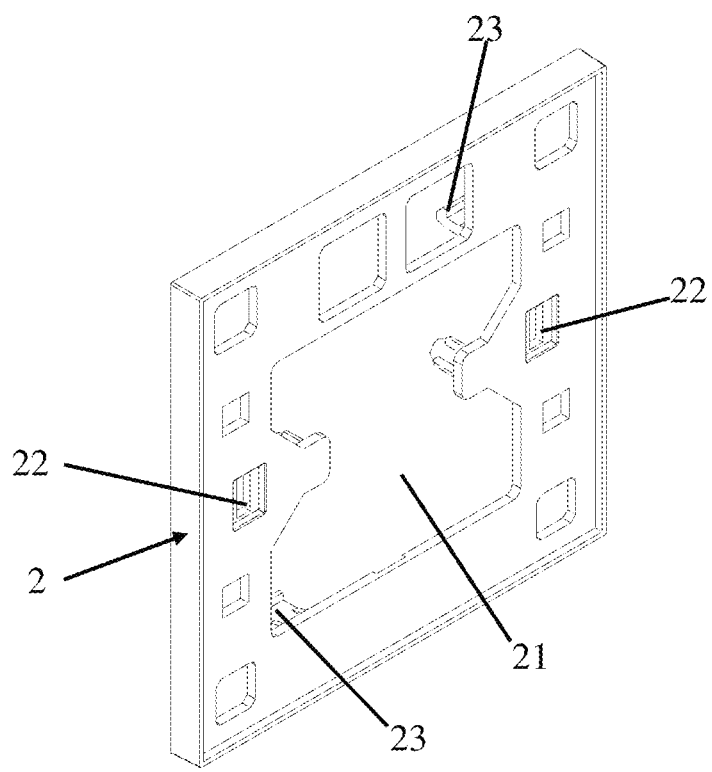
FIG. 7 is a stereoscopic diagram of the connecting plate.

FIG. 5 is a stereoscopic diagram of the mounting plate; FIG. 6 is a front view of the mounting plate as viewed from a side away from the connecting plate; FIG. 7 is a stereoscopic diagram of the connecting plate. In one of the embodiments, as shown in FIGS. 1-7, the connecting plate 2 has a first via hole 22 and the mounting plate 1 has a second via hole 12.

The tension strap 4 passes through the first via hole 22 and the second via hole 12 with clearance, and the tension strap 4 comprises stop end sockets 41 at both ends.

When disassembling the connecting plate 2 and the mounting plate 1, the tension strap 4 may slide relative to the first via hole 22 and the second via hole 12 to extend and retract and the connecting plate 2 may pull out or retract the tension strap 4. Thus, there is no need to operate the tension strap 4 specifically, and it is convenient to use the panel assembly.

The two ends of the tension strap 4 respectively have a stop end socket 41 configured to prevent the tension strap 4 from detaching from the first via hole 22 and the second via hole 12. The stop end socket 41 is a deformable plastic plate or plastic sheet, which may be deflected or squeezed to make the stop end socket 41 pass through the first via hole 22 and the second via hole 12. After the stop end socket 41 passes through the first via hole 22 and the second via hole 12, the stop end socket 41 may restore its shape and act as a limiting role.

In one of the embodiments, as shown in FIGS. 2 and 4, there is a tension strap 4 connected between the edges on each side of the connecting plate 2 and the mounting plate 1. Thus, the connecting plate 2 may be held more stably. Specifically, a first tension strap is connected between a first pair of corresponding edges of the connecting plate 2 and the mounting plate 1, a second tension strap is connected between a second pair of corresponding edges of the connecting plate 2 and the mounting plate 1.

In one of the embodiments, as shown in FIGS. 1, 2, 4, and 5, the mounting plate 1 is mounted with a slide frame 5 on the side/surface, directed away from the connecting plate 2, of the mounting plate 1, and the slide frame 5 is slidably connected with the mounting plate 1.

The connecting plate 2 has a buckle 23 configured to be in snap-fit with the slide frame and the mounting plate 1 has a third via hole 13, and the buckle 23 passes through the third via hole 13 with clearance.

The slide frame 5 has a connected state (e.g., a snap-fit state) and a detached state with the buckle 23.

An elastic member 6 is disposed between the mounting plate 1 and the slide frame 5 and configured to drive the slide frame 5 to be in snap-fit with the buckle 23.

In this embodiment, the connecting plate 2 has the buckle 23, which extends towards the slide frame 5. The mounting plate 1 has a third via hole 13, and the buckle 23 may pass through the third via hole 13 to be in snap-fit with the slide frame 5 disposed on the back of the mounting plate 1.

The slide frame 5 is slidably connected to the mounting plate 1, and the slide frame 5 may slide on the mounting plate 1, so as to be in snap-fit with the buckle 23 or detached from the buckle 23. The slide frame 5 may be connected to the mounting plate 1 through a slide rail.

The elastic member 6 is connected between the mounting plate 1 and the slide frame 5 and configured to drive the slide frame 5 to fall in or to be engaged with the buckle 23. The elastic member 6 may be selected from a resilient sheet or a spring.

The slide frame 5 is pre-mounted on the back of the mounting plate 1, and the elastic member 6 is connected between the mounting plate 1 and the slide frame 5. The user may use a tool to push up the slide frame 5, may pass the buckle 23 of the connecting plate 2 through the third via hole 13, and may align a groove of the buckle 23 with the frame edge of the slide frame 5. When the slide frame 5 is released, a frame edge of the slide frame 5 falls into the groove of the buckle 23 under an action of the elastic member 6, and thus the slide frame 5 is in snap-fit with the buckle 23 and the connecting plate 2 is connected to the mounting plate 1. When disassembling the connecting plate 2 from the connecting plate 2, the user may push up the slide frame 5 by the tool, and the frame edge of the slide frame 5 leaves the groove of the buckle 23. As this time, the user may the connecting plate 2 outward, the connecting plate 2 is disassembled from the mounting plate 1, and the tension strap 4 extends out and pulls the connecting plate 2.

If needed, an inclined plane may be provided on the side, facing the frame edge of the slide frame 5, of the buckle 23. After the buckle 23 passes through the third via hole 13, the slide frame 5 may be automatically pushed up under the action of the inclined plane, and the connecting plate 2 may be conveniently connected to the mounting plate 1.

In one of the embodiments, as shown in FIGS. 4, 6, and 8-10, the mounting plate 1 has a guiding groove 14 on the edge, directed away from the elastic member 6, of the mounting plate 1. The slide frame 5 has a guiding claw 55 on the edge, directed away from the elastic member 6, of the slide frame 5. The guiding claw 55 is in clearance fit with the guiding groove 14.

In this embodiment, a back surface of the mounting plate 1 has a guiding groove 14, and the guiding groove 14 is disposed opposite to the elastic member 6. The slide frame 5 has a guiding claw 55 disposed opposite to the elastic member 6. When the slide frame 5 is assembled to the mounting plate 1, the guiding claw 55 is fitted in the guide groove 14 with clearance.

To push up the slide frame 5 towards the elastic member 6, the user may insert an ejector post, an ejector pin, etc. into the guiding groove 14 to push up the guiding claw 55. After the guiding claw 55 is released, the elastic member 6 may drive the slide frame 5 to reset.

Figure 8:
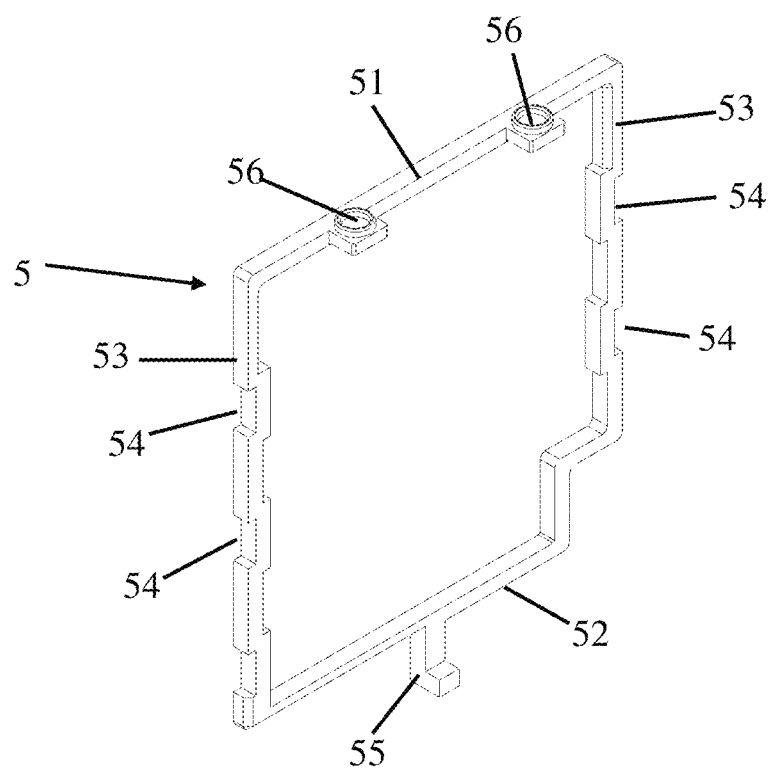
FIG. 8 is a stereoscopic diagram of the slide frame.
Figure 9:
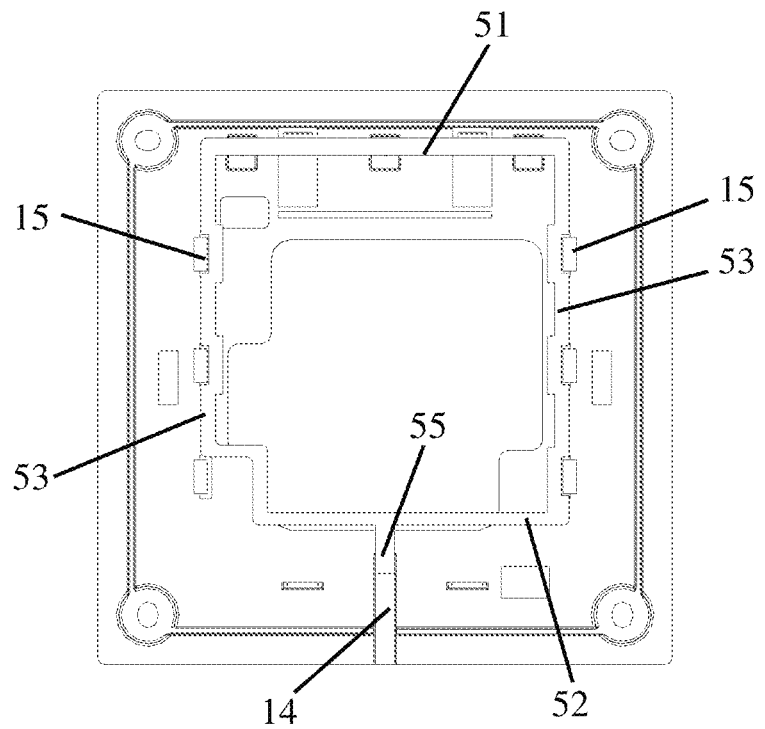
FIG. 9 is a schematic diagram of the guiding limiting buckle in the avoidance groove when mounting the sliding frame.
Figure 10:
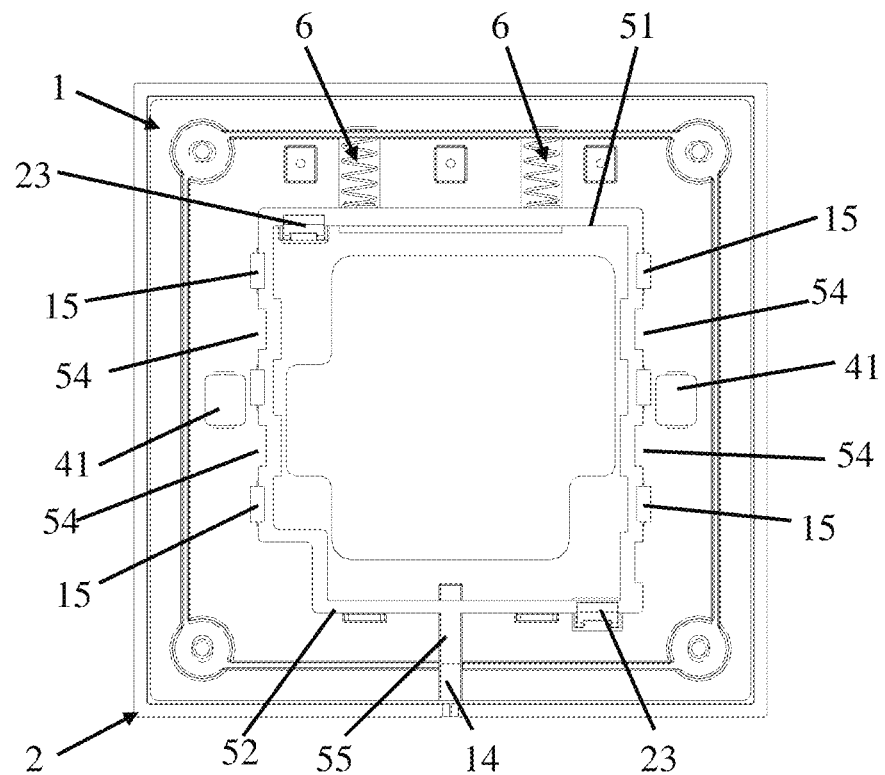
FIG. 10 is a schematic diagram of the elastic member making the slide be in snap-fit with the buckle.

FIG. 8 is a stereoscopic diagram of the slide frame; FIG. 9 is a schematic diagram of the guiding limiting buckle in the avoidance groove when mounting the sliding frame; FIG. 10 is a schematic diagram of the elastic member making the slide be in snap-fit with the buckle. In one of the embodiments, as shown in FIGS. 4, 6, and 8-10, the slide frame 5 comprises a first frame edge 51, a second frame edge 52, and two third frame edges 53 connected between the first frame edge 51 and the second frame edge 52.

The buckle 23 is in snap-fit with the first frame edge 51 or the second frame edge 52, and the elastic member 6 is assembled between the mounting plate 1 and the first frame edge 51 or the second frame edge 52.

The mounting plate 1 has a plurality of guiding limiting buckles 15 configured to guide the third frame edge 53 to slide.

Each of the two third frame edges 53 is in clearance fit with at least one guiding limiting buckle 15 of the plurality of guiding limiting buckles 15.

In this embodiment, the slide frame 5 comprises a first frame edge 51, a second frame edge 52, and two third frame edges 53, and the two third frame edges 53 are connected between the first frame edge 51 and the second frame edge 52.

The elastic member 6 is assembled between the mounting plate 1 and the first frame edge 51, or the elastic member 6 is assembled between the mounting plate 1 and the second frame edge 52. The first frame edge 51 or the second frame edge 52 has a mounting base 56 configured to mount an end of the elastic member 6. The buckle 23 is in snap-fit with the first frame edge 51 or the buckle 23 is in snap-fit with the second frame edge 52.

The sliding frame 5 slides along the direction of third frame edge 53. The mounting plate 1 has the guiding limiting buckles 15 at positions corresponding to the two third frame edges 53, and each of the two third frame edges 53 is in clearance fit with the guiding limiting buckle 15 configured to guide the third frame edges 53 to slide on the mounting plate 1.

The guiding limiting buckle 15 may be an L-shaped buckle, and the third frame edge 53 is blocked by the guiding limiting buckle 15 (e.g., the displacement of the third frame edge 53 in the direction of the first frame edge 51 and the second frame edge 52 is limited by the guiding limiting buckle 15). Thus, the third frame edge 53 may be prevented from being detached from the mounting plate 1. Also, the third frame edge 53 is assembled between the guiding limiting buckle 15 and the mounting plate 1 with clearance, and the third frame edge 53 may slide relative to the mounting plate 1.

In one of the embodiments, as shown in FIGS. 8 and 10, the third frame edge 53 also comprises an avoidance groove 54 configured to avoid the limitation of the guiding limiting buckle 15 during assembly.

When assembling the slide frame 5 onto the mounting plate 1, the user may first align the guiding limiting buckle 15 of the mounting plate 1 with the avoidance groove 54 on the third frame edge 53. The third frame edge 53 may be pressed, towards the mounting plate 1, into the inner side of the guiding limiting buckle 15, and then the elastic member 6 drives the slide frame 5 to move so that the part of the third frame edge 53 without the avoidance groove 54 slides into the guiding limiting buckle 15 to facilitate the installation of the slide frame 5. In the sliding process of the slide frame 5, the third frame edge 53 may not be separated from the guiding limiting buckle 15, and thus the structural stability may be improved.

In one of the embodiments, as shown in FIGS. 4-7, 9, and 10, the connecting plate 2 comprises two buckles 23, and the mounting plate 1 comprises two third via holes 13 corresponding to the two buckles 23. One of the two buckles 23 is in snap-fit with the first frame edge 51, and the other of the two buckles 23 is in snap-fit with the second frame edge 52. Thus, the assembly stability of the connecting plate 2 and the slide frame 5 may be improved.

In one embodiment, the two buckles 23 are disposed at intervals in the width direction of the connecting plate 2, and the connecting line of the two buckles 23 is on or parallel to the diagonal line of the connecting plate 2.

Figure 11:
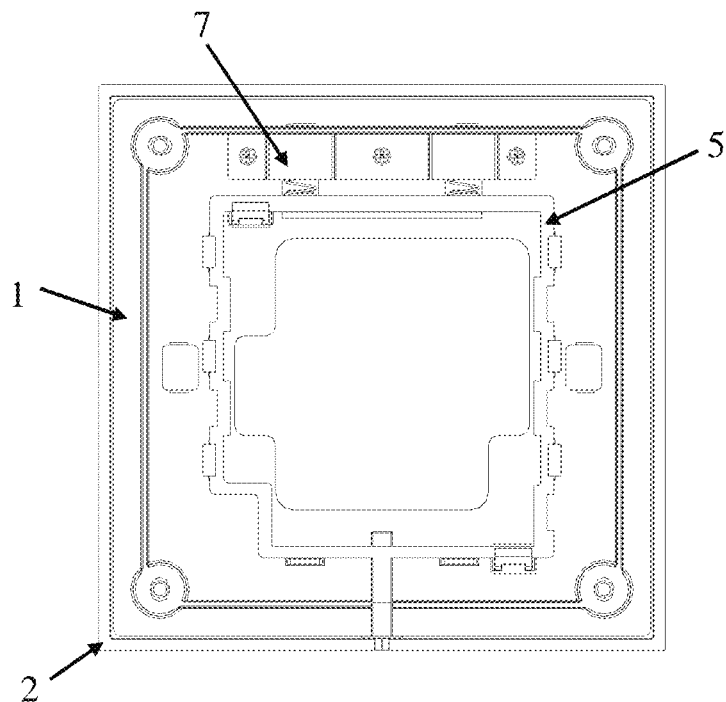
FIG. 11 is a schematic diagram of the stop strip mounted on one side of the mounting groove.

FIG. 11 is a schematic diagram of the stop strip mounted on one side of the mounting groove. In one embodiment, as shown in FIG. 2 and FIG. 11, the mounting plate 1 has a mounting groove 16, and the elastic member 6 is mounted in the mounting groove 16 and connected to the slide frame 5.

The mounting plate 1 also comprises a stop strip 7, and the stop strip 7 at least partially covers the side opening of the mounting groove 16.

In this embodiment, the mounting plate 1 has a mounting groove 16, one end of the elastic member 6 is mounted in the mounting groove 16, and the other end of the elastic member 6 is connected to the slide frame 5. An installation method is that: the mounting groove 16 is disposed on the side/surface, facing the first frame edge 51, of the mounting plate 1, and the other end of the elastic member 6 is connected to the mounting base 56 on the first frame edge 51 and configured to drive the slide frame 5 to slide towards the second frame edge 52. Another installation method is that: the mounting groove 16 is disposed on the side/surface, facing the second frame edge 52, of the mounting plate 1, and the other end of the elastic member 6 is connected to the mounting base 56 on the second frame edge 52 and configured to drive the slide frame 5 to slide towards the first frame edge 51.

A stop strip 7 is mounted on the mounting plate 1 through screws, and the stop strip 7 is disposed on the same side of the mounting plate 1 as the slide frame 5. The stop strip 7 is configured to block the side opening or back opening of the mounting groove 16 to prevent the elastic member 6 from disengaging from the side opening or back opening of the mounting groove 16.

FIG. 12 is a stereoscopic diagram of the mounting box according to an example of the present disclosure, wherein the connecting plate is hung on the mounting plate through a tension strap; FIG. 13 is an exploded view of the mounting box according to an example of the present disclosure. As shown in FIGS. 12 and 13, a mounting box according to an embodiment of the present disclosure comprising a bottom box 8 and a panel assembly according to any of the embodiments described above. The mounting plate 1 is mounted on the bottom box opening 81 of the bottom box 8.

The present disclosure provides a mounting box comprises a bottom box 8 and a panel assembly. The mounting plate 1 is mounted on the bottom box opening 81 of the bottom box 8 through a screw 17.

The structure, construction, and working principle of the panel assembly can be understood by referring to the previous description of the panel assembly and thus has been omitted herein.

The mounting box may be a socket-switch mounting box, an electric control mounting box, etc.

The socket-panel mounting box may be a socket box or a switch box in the home appliance field. The electric control mounting box may be a mounting box for realizing intelligent control of electrical appliances and comprises an electric control box 9.

The electric control box 9 is mounted by the bracket 91, and the bracket 91 is connected to the mounting plate 1. The electric control box 9 is disposed in the bottom box 8, and the electric control box 9 is connected to the electric wire in the bottom box 8 to achieve intelligent control of electrical appliances.

The description of the electric control box 9 has been omitted herein.

In summary, the panel assembly and mounting box according to the present disclosure may hold the connecting plate and the panel by configuring the tension strap. Thus, it is convenient for users to disassemble and repair. The panel assembly and the mounting box according to the present disclosure may be easily unlocked with one step by configuring a slide frame, a buckle, an elastic member, etc. to implement linkage. Thus, it is convenient for the users to disassemble the connecting plate and the mounting plate.

Figure 14:
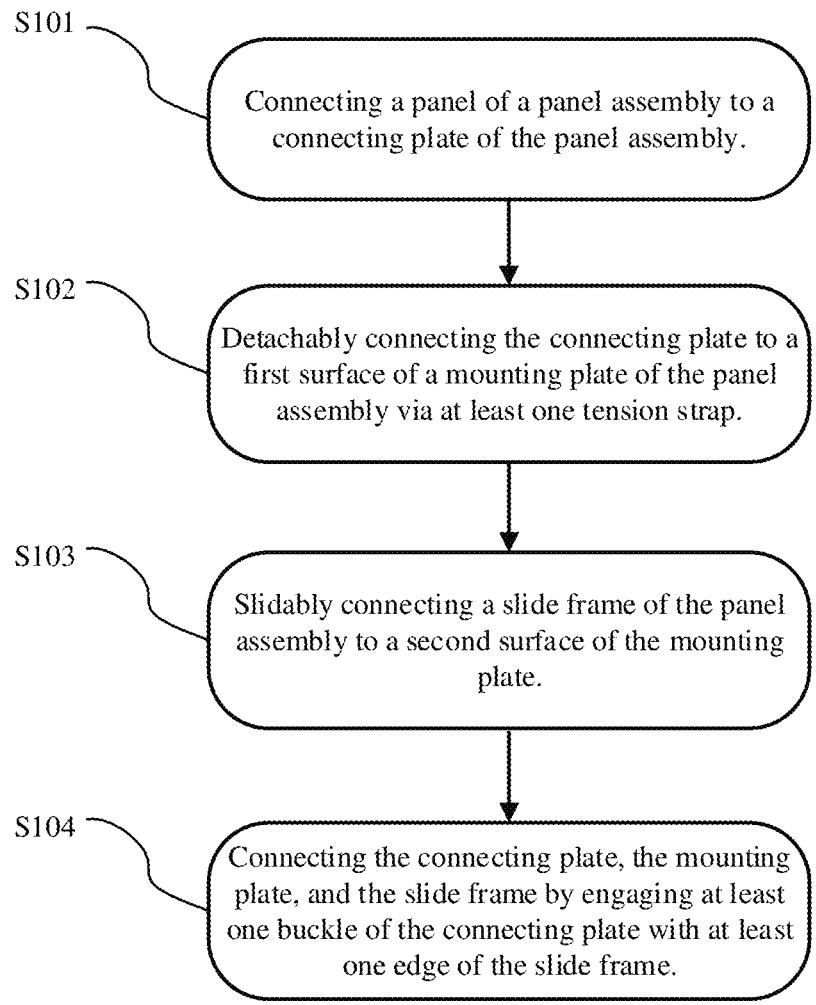
FIG. 14 is a flow chart of a method for assembling and disassembling the panel assembly according to an example of the present disclosure.

FIG. 14 is a flow chart of a method for assembling and disassembling the panel assembly according to an example of the present disclosure. The panel assembly in the method may be the panel assembly according to any of the foregoing embodiments and may be configured to perform an operation, function, or the like as described in the present disclosure.

At act S101, a user may connect the panel 3 of the panel assembly to the connecting plate 2 of the panel assembly.

Specifically, the panel 3 may be a tempered panel, and the panel 3 is fixedly mounted on the connecting plate 2. The connecting plate 2 and the panel 3 are removably connected, and the connecting plate 2 and the panel 3 may be connected through buckles, screws, magnets, etc.

At act S102, the user may detachably connect the connecting plate 2 to a first surface of the mounting plate 1 of the panel assembly via the at least one tension strap 4.

Specifically, the user may pass the at least one tension strap 4 through a first hole (e.g., the first via hole 22) of the connecting plate 2 and a second hole (e.g., the second via hole 12) of the mounting plate 1. A movement of the connecting plate 2 extends or retracts the tension strap 4 and thus drives the tension strap 4 to slide relative to the first hole and the second hole.

At act S103, the user may slidably connect the slide frame 5 of the panel assembly to a second surface of the mounting plate 1.

Specifically, the slide frame 5 comprises the first frame edge 51, the second frame edge 52, and two third frame edges 53 connected between the first frame edge 51 and the second frame edge 52. The elastic member 6 disposed on the first frame edge 51 or the second frame edge 52 is connected to the mounting groove 16 of the mounting plate 1. The guiding groove 14 disposed on an edge, directed away from the elastic member 6, of the mounting plate 1 is engaged with the guiding claw 55 disposed on an edge, directed away from the elastic member 6, of the slide frame 5. A displacement of the two third frame edges 53 in a direction of the first frame edge 51 and the second frame edge 52 is limited by guiding limiting buckles disposed on the mounting plate 1 at positions corresponding to the two third frame edges 53. The two third frame edges 53 each comprise the avoidance groove 54 configured to avoid a limitation of the guiding limiting buckles 15. The guiding limiting buckles 15 are aligned with the corresponding avoidance grooves 54.

At act S104, the user may connect the connecting plate 2, the mounting plate 1, and the slide frame 5 by engaging at least one buckle 23 of the connecting plate 2 with at least one edge of the slide frame 5.

Specifically, the user may pass, towards the slide frame 5, the at least one buckle 23 of the connecting plate 2 through a third hole (e.g., the third via hole 13) of the mounting plate 1. The user may connect the elastic member 6 between the mounting plate 1 and the slide frame 5. The elastic member 6 drives the slide frame 5 to be engaged with the at least one buckle 23.

The at least one buckle 23 of the connecting plate 2 comprises a first buckle and a second buckle, and the mounting plate comprises two third holes corresponding to the first buckle and the second buckle. The first buckle of the connecting plate 2 is engaged with the first frame edge 51, and the second buckle of the connecting plate 2 is engaged with the second frame edge 52.

The above technical solutions may be combined as required to achieve the best technical effect.

The above descriptions are merely the principle and the embodiments of the present disclosure. It should be noted that, for those having ordinary skill in the art, other modifications may be made based on the principle of the present disclosure and should also be regarded as falling in the protection scope of the present disclosure.

I claim:

1. A panel assembly, comprising:
    a mounting plate configured to be connected to a bottom box;
    a connecting plate detachably connected to the mounting plate; and
    a panel disposed on the connecting plate,
    wherein at least one tension strap is connected between the connecting plate and the mounting plate, and
    wherein when the connecting plate is detached from the mounting plate, the connecting plate and the mounting plate remain connected through the at least one tension strap.

2. The panel assembly according to claim 1,
    wherein the connecting plate comprises a first hole, and the mounting plate comprises a second hole,
    wherein the at least one tension strap passes through the first hole and the second hole, and
    wherein the at least one tension strap comprises a stop end socket at each end of the at least one tension strap.

3. The panel assembly according to claim 1,
    wherein the at least one tension strap comprises a first tension strap connected between a first pair of corresponding edges of the connecting plate and the mounting plate and comprises a second tension strap connected between a second pair of corresponding edges of the connecting plate and the mounting plate.

4. The panel assembly according to claim 1, further comprising:
    a slide frame disposed on a surface, directed away from the connecting plate, of the mounting plate and slidably connected to the mounting plate,
    wherein the connecting plate comprises a buckle configured to be connected to the slide frame,
    wherein the mounting plate comprises a third hole, and the buckle passes through the third hole,
    wherein the slide frame and the buckle are in a connected state or a detached state, and
    wherein the panel assembly further comprises an elastic member disposed between the mounting plate and the slide frame and configured to drive the slide frame to be connected to the buckle.

5. The panel assembly according to claim 4,
    wherein the mounting plate comprises a guiding groove disposed on an edge, directed away from the elastic member, of the mounting plate,
    wherein the slide frame comprises a guiding claw disposed on an edge, directed away from the elastic member, of the slide frame, and
    wherein the guiding claw is configured to be engaged with the guiding groove.

6. The panel assembly according to claim 4,
    wherein the slide frame comprises a first frame edge, a second frame edge, and two third frame edges connected between the first frame edge and the second frame edge,
    wherein the buckle is connected to the first frame edge or the second frame edge,
    wherein the elastic member is disposed between the mounting plate and the first frame edge or the second frame edge,
    wherein the mounting plate comprises guiding limiting buckles configured to guide the two third frame edges to slide, and
    wherein the two third frame edges are respectively engaged with the guiding limiting buckles.

7. The panel assembly according to claim 6,
    wherein the two third frame edges each comprise an avoidance groove configured to avoid a limitation of the guiding limiting buckles during assembly.

8. The panel assembly according to claim 6,
    wherein the connecting plate comprises two buckles, and the mounting plate comprises two third holes corresponding to the two buckles, and
    wherein a first buckle of the two buckles is engaged with the first frame edge, and a second buckle of the two buckles is engaged with the second frame edge.

9. The panel assembly according to claim 4,
    wherein the mounting plate comprises a mounting groove, and the elastic member is disposed in the mounting groove and connected to the slide frame, and
    wherein the mounting plate further comprises a stop strip, and the stop strip at least partially covers a side opening of the mounting groove.

10. A mounting box, comprising:
a bottom box; and
a panel assembly, comprising:
   a mounting plate connected to the bottom box;
   a connecting plate detachably connected to the mounting plate; and
   a panel disposed on the connecting plate,
wherein at least one tension strap is connected between the connecting plate and the mounting plate, and
wherein when the connecting plate is detached from the mounting plate, the connecting plate and the mounting plate remain connected through the at least one tension strap.

11. A method for assembling and disassembling a panel assembly, the method comprising:
   connecting a panel of the panel assembly to a connecting plate of the panel assembly;
   detachably connecting the connecting plate to a first surface of a mounting plate of the panel assembly via at least one tension strap;
   slidably connecting a slide frame of the panel assembly to a second surface of the mounting plate; and
   connecting the connecting plate, the mounting plate, and the slide frame by engaging at least one buckle of the connecting plate with at least one edge of the slide frame.

12. The method according to claim 11,
wherein the detachably connecting the connecting plate to the first surface of the mounting plate of the panel assembly via at least one tension strap comprises:
   passing the at least one tension strap through a first hole of the connecting plate and a second hole of the mounting plate, and
wherein a movement of the connecting plate extends or retracts the tension strap and thus drives the tension strap to slide relative to the first hole and the second hole.

13. The method according to claim 11,
wherein the connecting the connecting plate, the mounting plate, and the slide frame by engaging the at least one buckle of the connecting plate with the at least one edge of the slide frame comprising:
   passing, towards the slide frame, the at least one buckle of the connecting plate through a third hole of the mounting plate,
   connecting an elastic member between the mounting plate and the slide frame, and
   driving, by the elastic member, the slide frame to be engaged with the at least one buckle.

14. The method according to claim 13,
wherein the slide frame comprises a first frame edge, a second frame edge, and two third frame edges connected between the first frame edge and the second frame edge,
wherein the at least one buckle of the connecting plate comprises a first buckle and a second buckle, and the mounting plate comprises two third holes corresponding to the first buckle and the second buckle, and
wherein the engaging the at least one buckle of the connecting plate with the at least one edge of the slide frame comprising:
   engaging the first buckle of the connecting plate with the first frame edge, and
   engaging the second buckle of the connecting plate with the second frame edge.

15. The method according to claim 11,
wherein the slide frame comprises a first frame edge, a second frame edge, and two third frame edges connected between the first frame edge and the second frame edge,
wherein the slidably connecting the slide frame of the panel assembly to the second surface of the mounting plate comprises:
   connecting an elastic member disposed on the first frame edge or an elastic member disposed on the second frame edge to a mounting groove of the mounting plate.

16. The method according to claim 15,
wherein the slidably connecting the slide frame of the panel assembly to the second surface of the mounting plate further comprises:
   engaging a guiding groove disposed on an edge, directed away from the elastic member, of the mounting plate with a guiding claw disposed on an edge, directed away from the elastic member, of the slide frame.

17. The method according to claim 16,
wherein the slidably connecting the slide frame of the panel assembly to the second surface of the mounting plate further comprises:
   limiting a displacement of the two third frame edges in a direction of the first frame edge and the second frame edge by guiding limiting buckles disposed on the mounting plate at positions corresponding to the two third frame edges.

18. The method according to claim 17,
wherein the two third frame edges each comprise an avoidance groove configured to avoid a limitation of the guiding limiting buckles, and
wherein the slidably connecting the slide frame of the panel assembly to the second surface of the mounting plate further comprises:
   aligning the guiding limiting buckles with the corresponding avoidance grooves.

19. The method according to claim 11, further comprising:
   detaching the connecting plate from the first surface of the mounting plate by pushing up the slide frame to disengage the at least one buckle from the at least one edge of the slide frame when disassembling the panel assembly.

20. The method according to claim 18, further comprising:
   keeping the connecting plate and the mounting plate connected via the at least one tension strap when the connecting plate is detached from the first surface of the mounting plate.

* * * * *